United States Patent
Park et al.

(10) Patent No.: US 12,283,005 B2
(45) Date of Patent: Apr. 22, 2025

(54) METHOD AND APPARATUS FOR PROCESSING VISUAL NETWORK SERVICE

(71) Applicant: ELECTRONICS AND TELECOMMUNICATIONS RESEARCH INSTITUTE, Daejeon (KR)

(72) Inventors: Pyung Koo Park, Daejeon (KR); Tae Yeon Kim, Daejeon (KR); Ho Sun Yoon, Daejeon (KR); Byeong Ok Kwak, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 388 days.

(21) Appl. No.: 17/856,153

(22) Filed: Jul. 1, 2022

(65) Prior Publication Data

US 2023/0215110 A1     Jul. 6, 2023

(30) Foreign Application Priority Data

Jan. 5, 2022   (KR) .................. 10-2022-0001627

(51) Int. Cl.
*G06T 19/00*        (2011.01)
*G06F 16/93*        (2019.01)
*H04L 67/306*       (2022.01)

(52) U.S. Cl.
CPC ............ *G06T 19/006* (2013.01); *G06F 16/93* (2019.01); *H04L 67/306* (2013.01)

(58) Field of Classification Search
CPC ...... G06T 19/006; G06F 16/93; H04L 67/306
See application file for complete search history.

(56) References Cited

U.S. PATENT DOCUMENTS

| | | | |
|---|---|---|---|
| 2006/0241792 A1* | 10/2006 | Pretlove | G06F 3/011 700/83 |
| 2009/0141021 A1 | 6/2009 | Lee et al. | |
| 2017/0373917 A1 | 12/2017 | Kim et al. | |
| 2022/0165036 A1* | 5/2022 | Daley | G02B 27/0172 |

FOREIGN PATENT DOCUMENTS

| | | | | |
|---|---|---|---|---|
| EP | 4141634 A1 * | 3/2023 | ........... | G06F 1/1694 |
| KR | 10-2011-0070681 A | 6/2011 | | |
| KR | 10-1962635 B1 | 3/2019 | | |
| KR | 10-2020-0111032 A | 9/2020 | | |
| KR | 10-2171103 B1 | 10/2020 | | |
| KR | 10-2183574 B1 | 11/2020 | | |

\* cited by examiner

*Primary Examiner* — Daniel F Hajnik
*Assistant Examiner* — Jed-Justin Imperial
(74) *Attorney, Agent, or Firm* — LRK PATENT LAW FIRM

(57) ABSTRACT

Disclosed herein are a method and apparatus for processing an application service. The method includes: registering a user using a visual network service and at least one physical entity supporting the visual network service; mapping at least one virtual entity corresponding to the at least one physical entity; in response to the user's entering a visual network service space, displaying the at least one virtual entity on a terminal device of the user; and confirming a user input for the at least one virtual entity and controlling an operation of the at least one physical entity corresponding to the at least one virtual entity.

10 Claims, 15 Drawing Sheets

METHOD AND APPARATUS FOR PROCESSING VISUAL NETWORK SERVICE

CROSS REFERENCE TO RELATED APPLICATION

The present application claims priority to Korean patent application No. 10-2022-0001627, filed Jan. 5, 2022, the entire contents of which are incorporated herein for all purposes by this reference.

BACKGROUND OF THE INVENTION

1. Field of the Invention

The present disclosure relates to a virtual reality technology and, more particularly, to a service method and apparatus which are provided to a user in a virtual reality environment.

2. Description of Related Art

Virtual reality, augmented reality or mixed reality are terms that are frequently used in recent years, and these refer to constructing the physical world, that is, the real world and a virtual world (or cyber world) made by a computer or other devices into a single space. Virtual reality, augmented reality and mixed reality are distinguished from one another depending on how to construct them.

Virtual reality means a specific environment or situation, which is similar to but not identical with reality and is made by an artificial technology using computers, or the technology itself. That is, as a virtual world is operated separate from the real world to which a user belongs, the physical world and the virtual world are recognized as totally different worlds, imposing no interference on each other.

Augmented reality is originally an area of virtual reality but is also a technology of synthesizing virtual things or information into a real environment, which is basically in the physical world, so that the virtual things look as if they are in the real environment. Herein, the virtual reality and the physical reality are shared but there is no interaction between them. That is, it is possible to project a virtual thing onto a physical space, but there is no medium to be shared by both. Consequently, although a viewer obtains information of the two spaces simultaneously, no action is generated from interconnection of things between the physical space and the virtual space.

Being a mixed concept of the existing virtual reality and augmented reality, mixed reality is a technology of blending information of reality and virtual reality to make a realistic virtual world. In mixed reality, there may be interaction between the physical world and the virtual world. As an example, a virtual cup made in a virtual world can be put on a real desk that belongs to the physical world. Although it depends on methods of implementing applications, in this case, a simulation is possible to make the cup fall on the floor when the desk tilts.

Meanwhile, in order to implement virtual reality, augmented reality and mixed reality, a device is needed which a user can utilize, and such devices as smartphones are normally used since users can easily carry them around. Recently, wearable devices like smart glasses are used which have higher availability by liberating both hands. However, since such portable devices should be small enough for users to wear, they have difficulty with satisfying computing performance that is usually expected to implement a mixed reality service.

SUMMARY

Since clouds provide an offloading service of handling a process requiring massive computation, which a user device cannot accommodate, by accumulating computing resources and enabling a plurality of users to share the resource via the Internet or other networks, users can use a service that demands more abundant computation-intensive computing performance.

Due to a distance between a central computing resource for implementing computation and a user device, clouding computing has a limitation of inapplicability to a service, for which real-time performance is essential, among mixed reality services. Recently, in order to provide a more sophisticated mixed reality service by minimizing latency between a user device and a computing resource, edge computing is highlighted which locates a computing resource at the center as close to a user device as possible. Although not providing such abundant resources as guaranteed by cloud computing, edge computing is capable of satisfying, to a considerable degree, latency and computing performance expected by a service, since it is located as close to a user device as one hop.

A technical object of the present disclosure is to provide a method and apparatus for providing a visual network service based on virtual reality, augmented reality or mixed reality in an edge computing environment.

Another technical object of the present disclosure is to provide a method and apparatus for constructing a physical entity present in a virtual reality, augmented reality or mixed reality environment into a virtual space and for providing a visual network service based on it.

Yet another technical object of the present disclosure is to provide a method and apparatus for grouping physical entities present in a virtual reality, augmented reality or mixed reality environment and constructing them into a virtual space and for providing a visual network service based on it.

The technical problems solved by the present disclosure are not limited to the above technical problems and other technical problems which are not described herein will become apparent to those skilled in the art from the following description.

According to an embodiment of the present disclosure, there is provided a method for processing an application service. The method comprising: registering a user using a visual network service and at least one physical entity supporting the visual network service; mapping at least one virtual entity corresponding to the at least one physical entity; in response to the user's entering a visual network service space, displaying the at least one virtual entity on a terminal device of the user; and confirming a user input for the at least one virtual entity and controlling an operation of the at least one physical entity corresponding to the at least one virtual entity.

According to another embodiment of the present disclosure, there is provided an apparatus for processing an application service. The apparatus comprising: an application server device configured to manage a user using a visual network service and at least one physical entity supporting the visual network service; a cloud server device configured to manage at least one virtual entity corresponding to the at least one physical entity; a user terminal configured to output data providing the visual network service and to provide the visual network service by confirming a user input: and a node device configured to: map and manage at least one virtual entity corresponding to the at least one physical entity, in response to the user's entering a visual network service space, display the at least one virtual entity on a terminal device of the user, and in response to a user input, control an operation of the at least one physical entity corresponding to the at least one virtual entity.

The features briefly summarized above for this disclosure are only exemplary aspects of the detailed description of the disclosure which follow, and are not intended to limit the scope of the disclosure.

According to the present disclosure, it is possible to provide a method and apparatus for providing a visual network service based on virtual reality, augmented reality or mixed reality in an edge computing environment.

Also, according to the present disclosure, it is possible to provide a method and apparatus for constructing a physical entity present in a virtual reality, augmented reality or mixed reality environment into a virtual space and for providing a visual network service based on it.

Also, according to the present disclosure, it is possible to provide a method and apparatus for grouping physical entities present in a virtual reality, augmented reality or mixed reality environment and constructing them into a virtual space and for providing a visual network service based on it.

Also, according to the present disclosure, it is possible to provide a method and apparatus for dynamically constructing a physical network or a virtual network between users of a same group in a virtual reality, augmented reality or mixed reality environment.

Also, according to the present disclosure, it is possible to provide a method and apparatus for dynamically exchanging data with a physical entity present in a virtual reality, augmented reality or mixed reality environment.

Effects obtained in the present disclosure are not limited to the above-mentioned effects, and other effects not mentioned above may be clearly understood by those skilled in the art from the following description.

DETAILED DESCRIPTION

Figure 1:
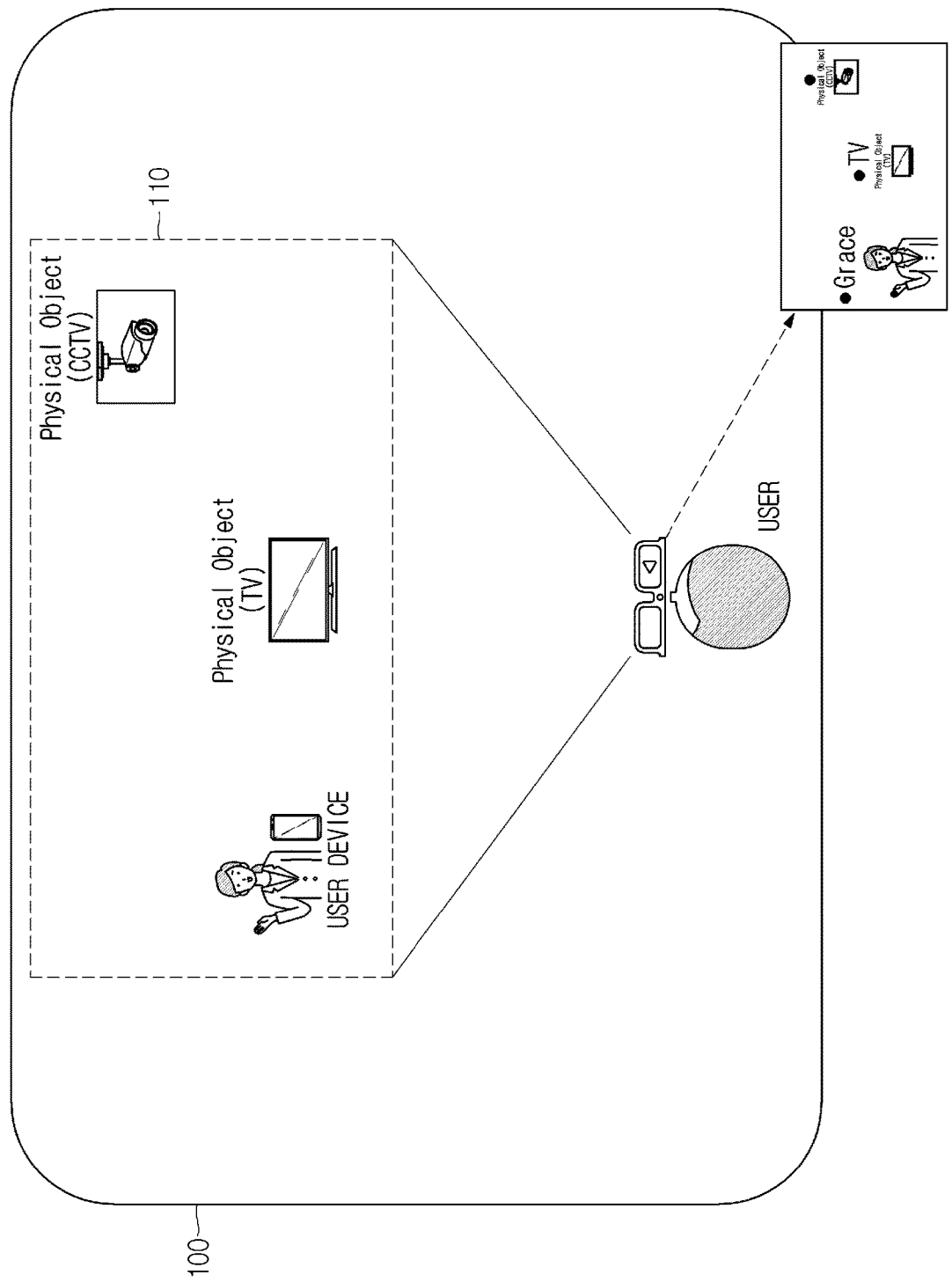
FIG. 1 is a view illustrating a service space in which a visual network service is provided according to an embodiment of the present disclosure.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

Hereinafter, embodiments of the present disclosure will be described with reference to the accompanying drawings.

Figure 2:
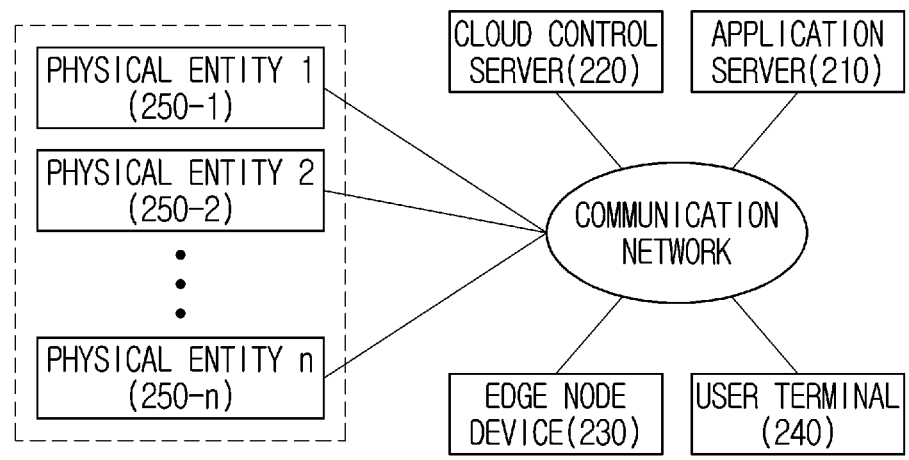
FIG. 2 is a block diagram showing a visual network service operating system according to an embodiment of the present disclosure.

FIG. 1 is a view illustrating a service space in which a visual network service is provided according to an embodiment of the present disclosure, and FIG. 2 is a block diagram showing a visual network service operating system according to an embodiment of the present disclosure.

First, at least one physical entity 110 may exist in a service space 100, and when a user enters the service space 100, the service space 100 may be displayed on a user terminal 120. Herein, the at least one physical entity 110 in the service space 100 may be displayed on the user terminal 120, and based on a visual network service, information for identifying the at least physical entity 110 may be provided together. For example, the visual network service may display state information of the physical entity 110 or a name of the physical entity 110.

FIG. 2 is a block diagram showing a visual network service operating system according to an embodiment of the present disclosure.

Referring to FIG. 2, in order to provide a visual network service, a visual network service operating system according to an embodiment of the present disclosure may include an application server 210, a cloud control server 220, an edge node device 230, a user terminal 240, and a physical entity 250. In the system, the application server 210, the cloud control server 220, the edge node device 230, the user terminal 240, and the physical entity 250 may be connected via a communication network. Herein, the communication network may include a wireless network like WiFi and Bluetooth.

The application server 210 may store and manage basic information necessary for operating a visual network service. As an example, it may create an account for a user using the visual network service and store and manage information of the user. In addition, the application server 210 may store and manage information for identifying the user terminal 240 used by a user. As an example, the application server 210 may include a user identifier, service subscription information, service use information, a user terminal identifier and the like.

In addition, the application server 210 may store and manage information on the physical entity 250 supporting a visual network service. As an example, the application server 210 may store and manage a location of a physical entity, an identifier of a physical entity, a type of a physical entity and the like.

The cloud control server 220, which is a constitutional unit for managing a service using a virtual entity, may be interlocked with the application server 210 and store and manage information on the virtual entity. Herein, the information on the virtual entity may include an identifier of the virtual entity, a type of the virtual entity, and the like.

In addition, the cloud control server 220 may be connected with the edge node device and provide information on a virtual entity to the edge node device 230.

As the application server 210 is not directly connected with the edge node device 230, information associated with the edge node device 230 cannot be confirmed, and the cloud control server 220 may manage a virtual entity list and manage which virtual entity is connected and how it is connected. In addition, the cloud control server 220 may have a repository and run and manage an actual operating program of a virtual entity.

The edge node device 230 may generate and manage a mapping relation between a physical entity and a virtual entity, which is generated in response to the physical entity, and may provide infrastructure to provide a visual network service by relaying information delivery.

The user terminal 240 may be a terminal device which enables a user, who enters the service space 100, to check an image of the service space 100 and to use a visual network service. The image of the service space 100 may include an image, an augmented image and the like, which are captured through the terminal device. As an example, the user terminal 240 may include a terminal device such as a smartphone, a tablet PC, or a smart glass, which a user carries or wears to directly use a service. As another example, the image of the service space 100 may include an image of a virtual space, a virtual reality image and the like, and the user terminal 240 may include a notebook computer, a laptop, a PC and the like.

Figure 3:
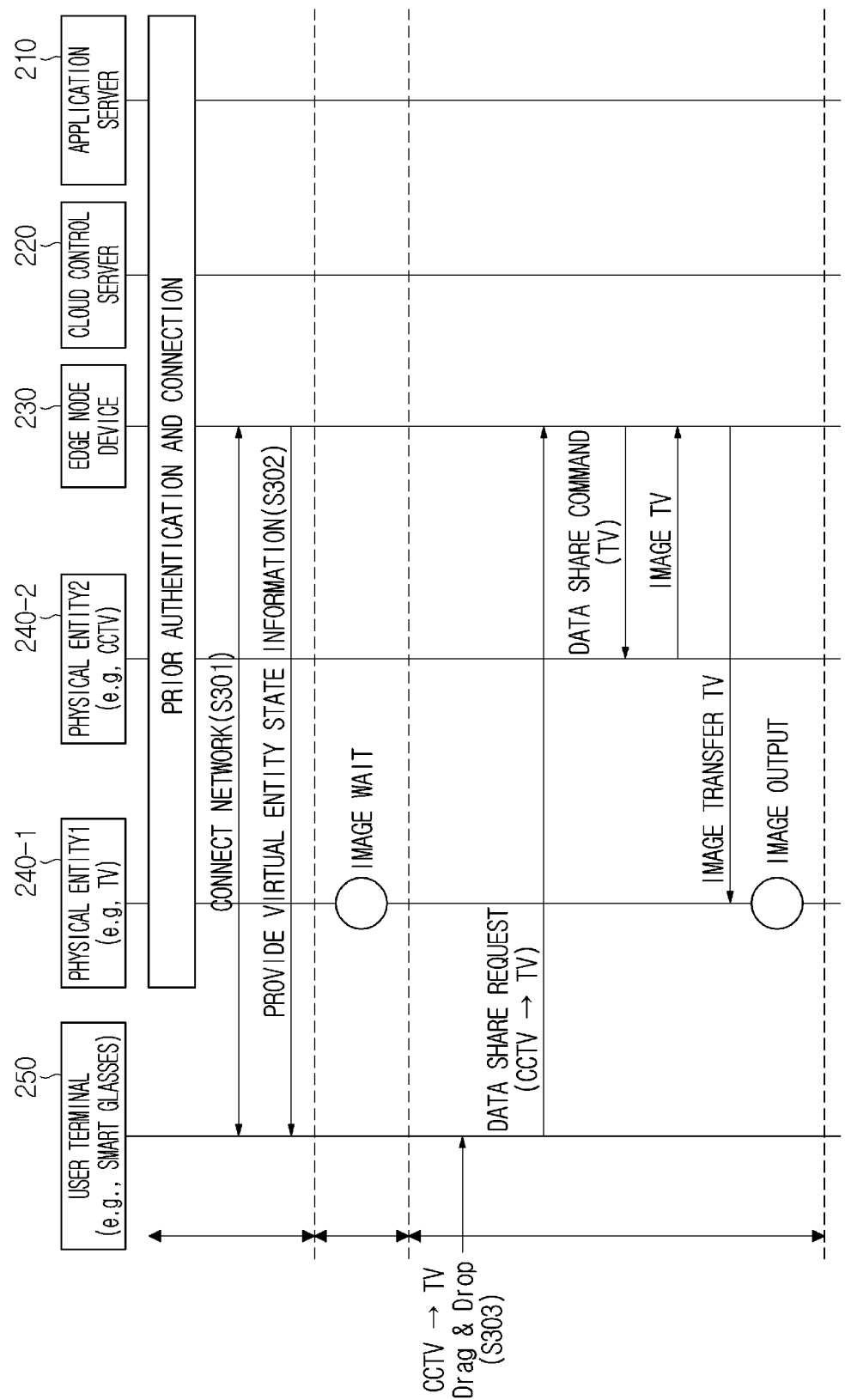
FIG. 3 is a view illustrating an operation of a visual network service operating system according to an embodiment of the present disclosure.

FIG. 3 is a view illustrating an operation of a visual network service operating system according to an embodiment of the present disclosure.

First, the application server 210, the cloud control server 220, the edge node device 230 and physical entities 240-1 and 240-2, which are provided in a visual network service operating system, are illustrated to be connected through prior authentication.

A user with the user terminal 250 may enter a service space and use a visual network service. When entering a service space, the user terminal 250 may be connected with the edge node device 230 (S301).

There may be at least one physical entity 240-1, 240-2 within a view angle confirmed through the user terminal 250. In consideration of this, the user terminal 250 may check a direction, in which it is facing, and transmits relevant information to the edge node device 230, and the edge node device 230 may check the physical entities 240-1 and 2401-2 in the direction and provide state information of a corresponding virtual entity (S302).

In response to this, the user terminal 250 may display state information in a position adjacent to the physical entities 240-1 and the 240-2.

The user terminal 250 may confirm a user input and provide a visual network service based on the user input. As an example, in an embodiment of the present disclosure, through FIG. 3, it is illustrated that image data captured through a CCTV entity (physical entity 2 240-2) are output to a TV entity (physical entity 1 240-1).

For example, among various entities displayed on the user terminal 250, the user may select the CCTV entity (physical entity 2 240-2) and forward the selected CCTV entity (physical entity 2 240-2) to the TV entity (physical entity 1 240-1). In response to this, the user terminal 250, which performs the visual network service, may confirm an identifier of a virtual entity corresponding to the CCTV entity (physical entity 2 240-2) and an identifier of a virtual entity corresponding to the TV entity (physical entity 1 240-1) and may forward, to the edge node device 230, a message for requesting data share from the virtual entity corresponding to the CCTV entity (physical entity 2 240-2) to the virtual entity corresponding to the TV entity (physical entity 1 240-1) (S304).

The edge node device 230 may transmit a data share command to the CCTV entity (physical entity 2 240-2) (S305) and receive image data from the CCTV entity (physical entity 2 240-2) (S306). Next, the edge node device 230 may forward the image received from the CCTV entity (physical entity 2 240-2) to the TV entity (physical entity 1 240-1) and request image reproduction (S307). In response to this, the TV entity (physical 1 240-1) may output the image data received from the CCTV entity (physical entity 2 240-2) (S308).

Although, in an embodiment of the present disclosure, a method for outputting image data captured through the CCTV entity (physical entity 2 240-2) on the TV entity (physical entity 1 240-1) is illustrated, but the present disclosure is not limited thereto, and various scenarios and corresponding methods may be implemented.

FIG. 4A to FIG. 4E are an illustration of a visual network service provided by a visual network service operating system according to an embodiment of the present disclosure.

Figure 4A:
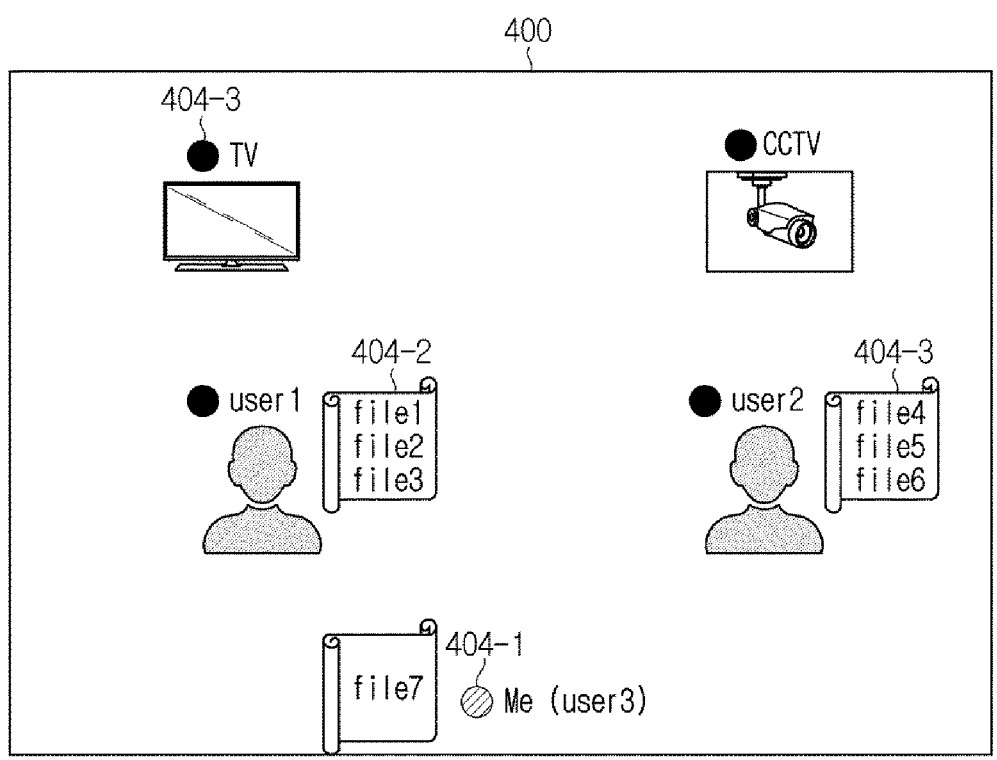
FIG. 4A to FIG. 4E are an illustration of a visual network service provided by a visual network service operating system according to an embodiment of the present disclosure.
Figure 4B:
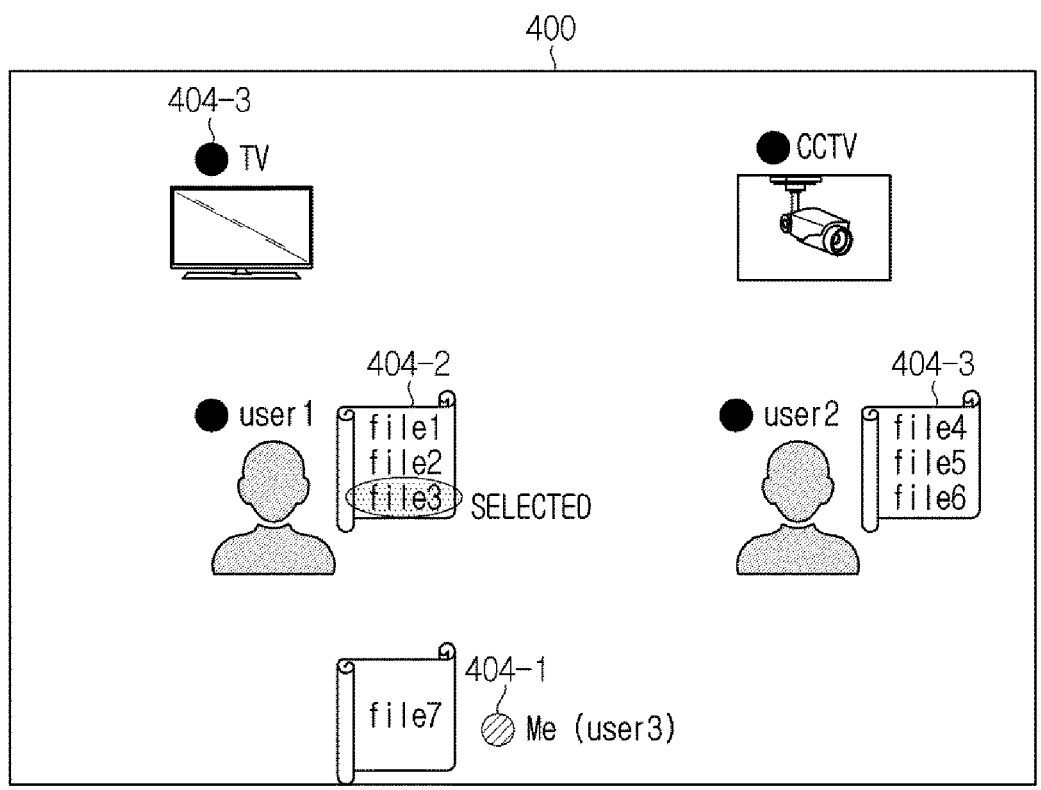
Figure 4C:
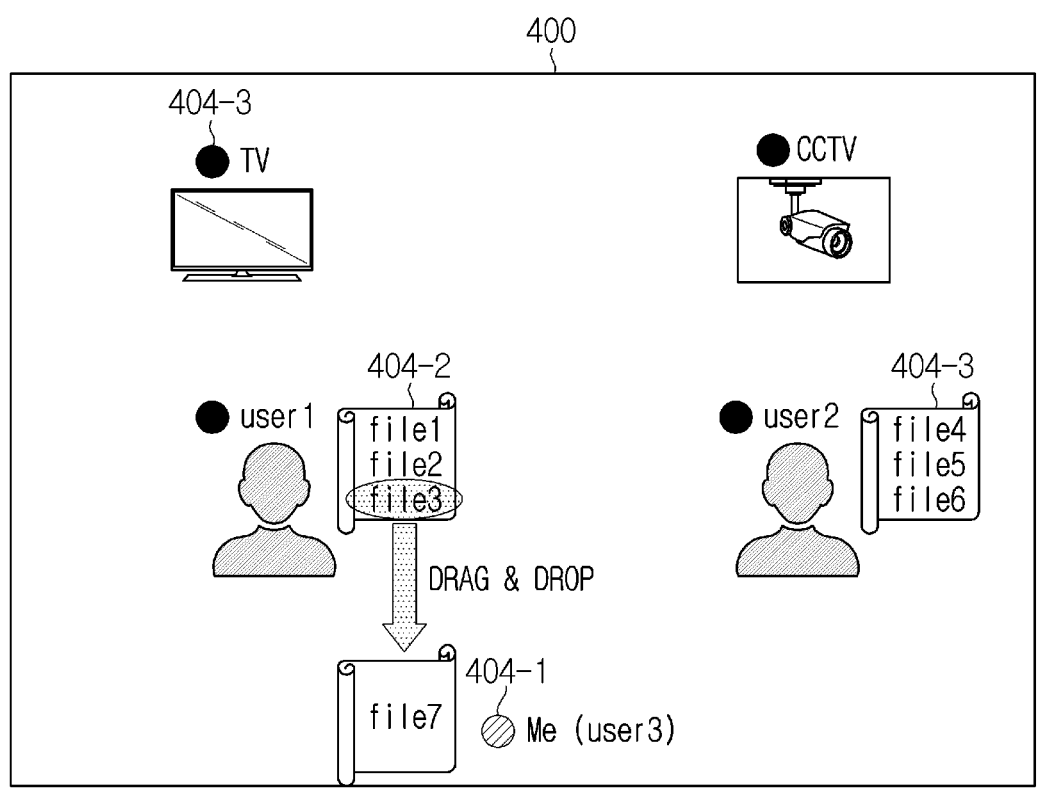

Referring to FIG. 4A to FIG. 4C, an operation of sharing data via a visual network service is illustrated. There may be a plurality of users in a visual network service space 400, and there may be user terminals 404-1, 404-2 and 404-3 corresponding to the plurality of users respectively. As an example, the user terminals 404-1, 404-2 and 404-3 may store data, which a user allows to share, and provide a list of data allowed to be shared via a visual network service. Accordingly, the user may select data from a object entity in the data list of the user terminals 404-1, 404-2 and 404-3 and transfer the selected data to a target entity to which the data are to be forwarded. Herein, the transfer of the selected data may be implemented by a drag and drop input. A user terminal 404-1 may forward data selected by the user, information on an object entity 404-2 and information on a target entity 404-3 to an edge node device, and the edge node device may configure a transfer command using an identifier of the selected data, the information on the object entity 404-2 and the information on the target entity 404-1. In addition, the edge node device may receive the selected data from the object physical entity 404-2, forward the data to the target physical entity 404-1 and forward a storage or reproduction command. In response to this, the target physical entity 404-1 may store or reproduced the forwarded data.

Figure 4D:
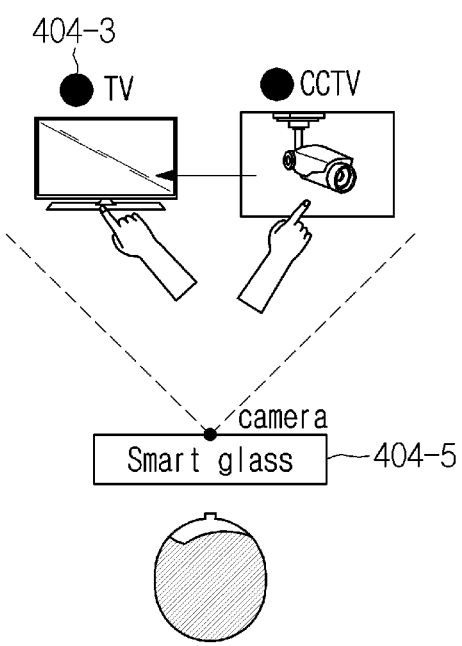
Figure 4E:
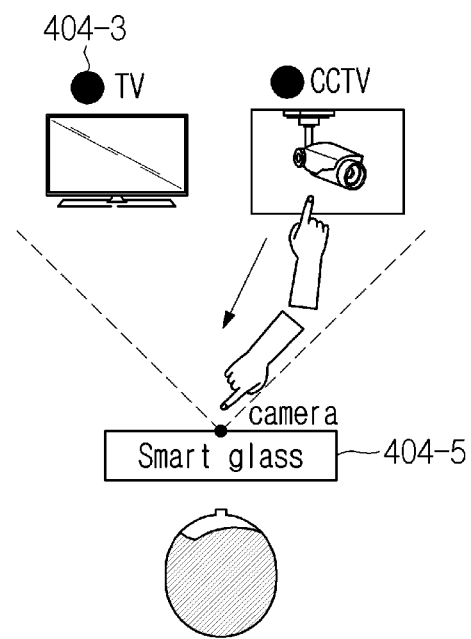

FIG. 4D and FIG. 4E are views for explaining a process of performing a drag-and-drop inputting operation using smart glasses, and referring to FIG. 4D and FIG. 4E, a user wearing smart glasses 404-5 displays object entities through the screen of the smart glasses 404-5, for example, a physical entity of a TV 404-3 and a CCTV or a virtual entity corresponding to a TV and a CCTV. Accordingly, the user may stretch his hand to select a CCTV, select data, which the user wants to share, from the CCTV, and then move the selected data to the TV 404-3 through a drag-and-drop input using a finger. Thus, the user can move data of the CCTV to the TV 404-3. Likewise, the user may stretch his hand in the air to select a CCTV, select data, which the user wants to share, from the CCTV and then move the selected data to the user himself or the smart glasses 404-5 through a drag-and-drop input using a finger. Thus, the user can move data of the CCTV to the smart glasses 404-5. In the cases of FIG. 4D and FIG. 4E, a drag-and-drop operation from an object entity to a target entity may be performed through a physical entity recognition of a TV and a CCTV by camera and through a user's finger recognition by the camera.

Figure 5A:
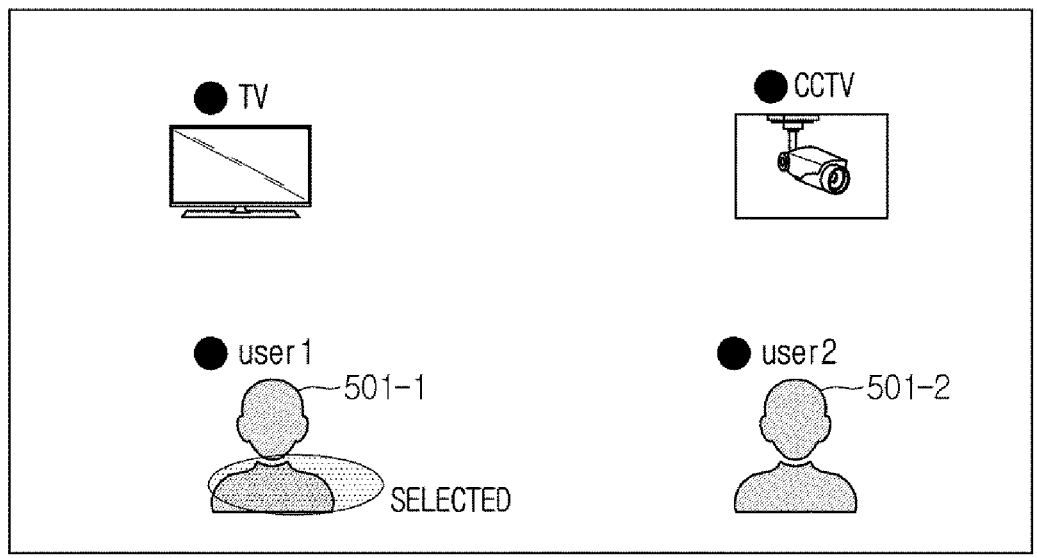
FIG. 5A to FIG. 5C are another illustration of a visual network service provided by a visual network service operating system according to an embodiment of the present disclosure.
Figure 5B:
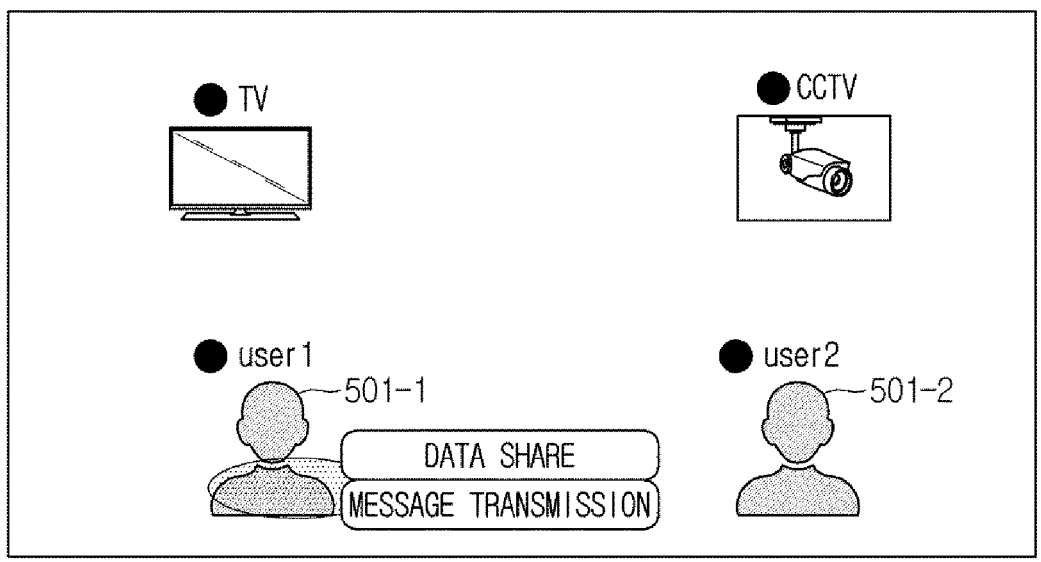
Figure 5C:
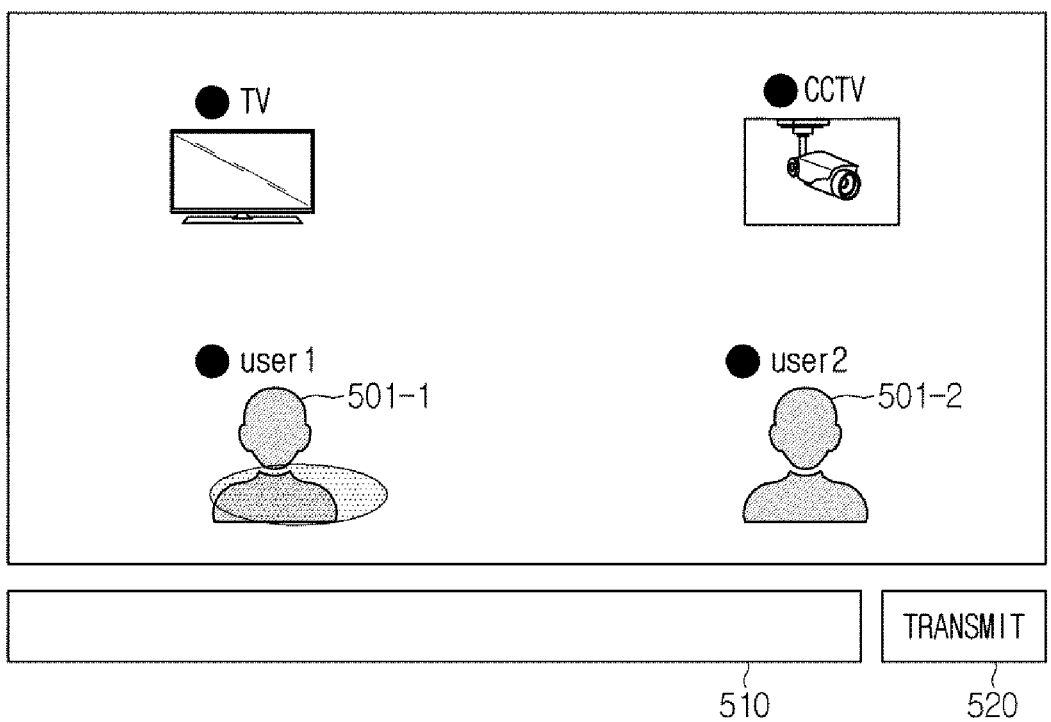

FIG. 5A to FIG. 5C are another illustration of a visual network service provided by a visual network service operating system according to an embodiment of the present disclosure.

Referring to FIG. 5A to FIG. 5C, an operation of sharing data via a visual network service is illustrated. There may be a plurality of users in a visual network service space, and there may be user terminals 504-1 and 504-2 corresponding to the plurality of users respectively. As an example, a user may select a user present in the visual network service space and request to chat with the selected user. As an example, as a user touches, for a predetermined time or longer, a first user 501-1 existing in the visual network service space, a user terminal may enable a predetermined menu or UI. Herein, the predetermined menu or UI 505 may include data sharing or message transfer. Next, the user terminal may confirm the user's selecting message transfer and enable a message input window 510.

Next, the user may input a message through the message input window 510 and input a transfer button 520. In response to this, the user terminal may confirm message data, which is input on the message input window 510, and forward information on the selected first user 501-1 to an edge node device, and the edge node device may configure a transfer command of the message data by using the input message data and the information on the first user 501-1. In addition, the edge node device may forward the message data to a user terminal corresponding to the first user 501-1 and forward the message transfer command. In response to this, the user terminal corresponding to the first user 501-1 may output the forwarded message data.

FIG. 6A to FIG. 6E are another illustration of a visual network service provided by a visual network service operating system according to an embodiment of the present disclosure.

Referring to FIG. 6A to FIG. 6E, an operation of sharing data via a visual network service is illustrated. In a visual network service space, there may be different users 610-1 and 610-2, and there may be a user terminal 601 corresponding to a user. As an example, a user may select a user present in the visual network service space and process data sharing with the selected user 610-1, 610-2. As an example, as a user touches, for a predetermined time or longer, a first user 610-1 existing in the visual network service space, a user terminal may enable a predetermined menu or UI 620 (refer to FIG. 6B). Herein, the predetermined menu or UI may include data sharing and the like. Next, the user terminal may confirm the user's selecting the data sharing 620. In response to this, the user terminal may request data corresponding to the first user 610-1 to an edge node device, and the edge node device may confirm data corresponding to the first user 610-1 and provide a data list to be shared to the user terminal 601. As an example, the data corresponding to the first user 610-1 may be data stored in a user terminal of the first user 610-1.

Figure 6A:
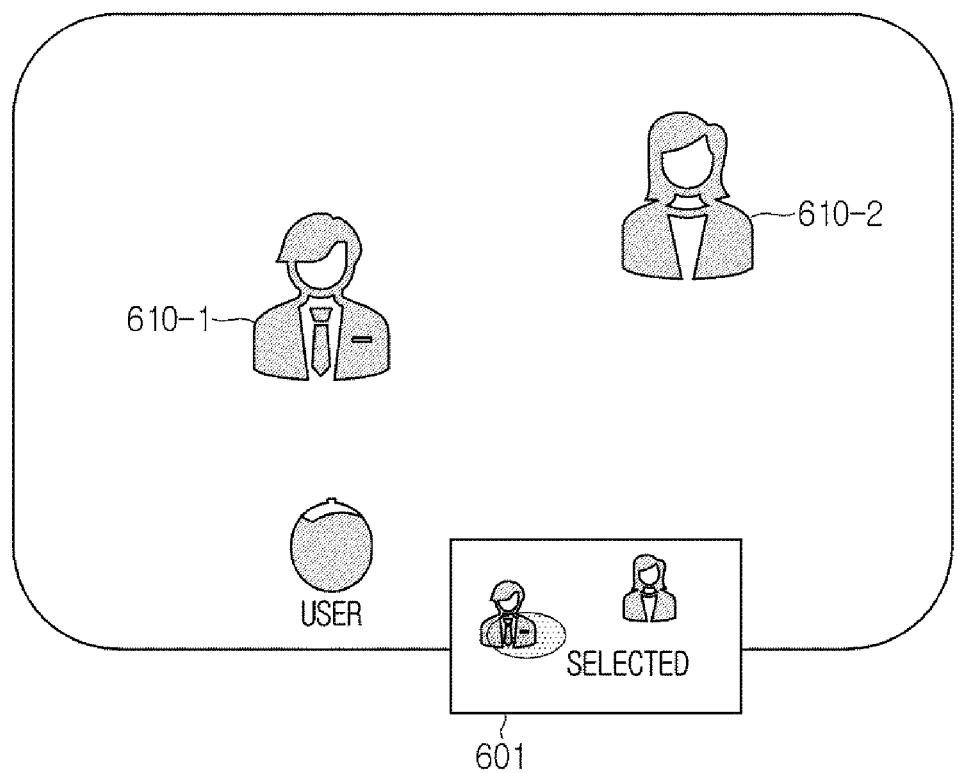
FIG. 6A to FIG. 6E are another illustration of a visual network service provided by a visual network service operating system according to an embodiment of the present disclosure.
Figure 6B:
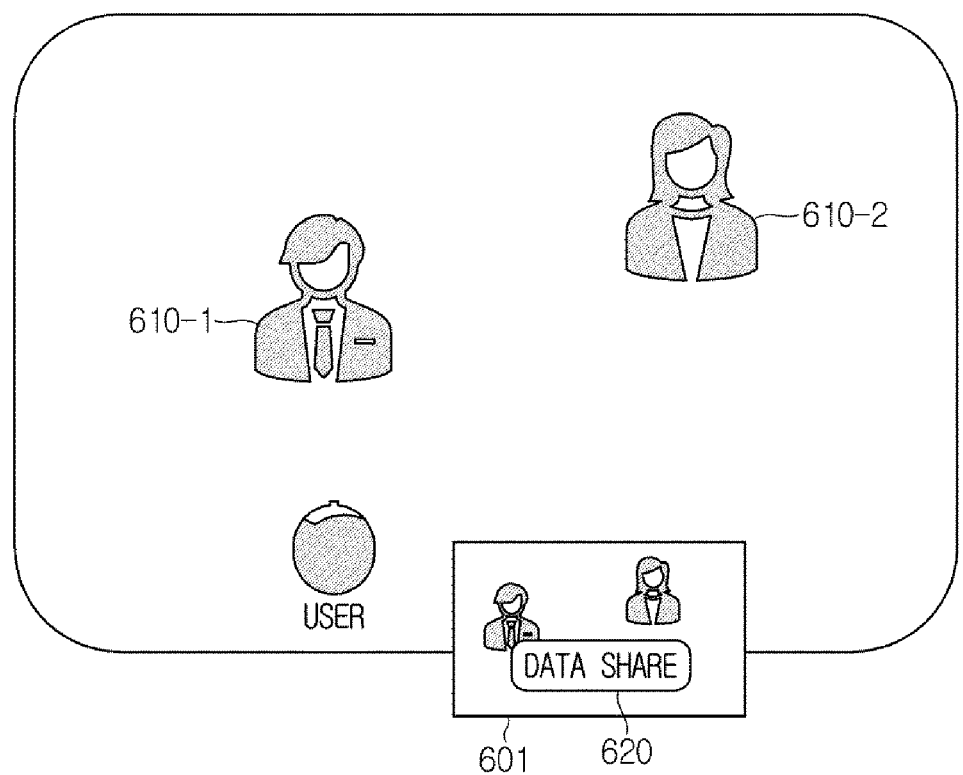
Figure 6C:
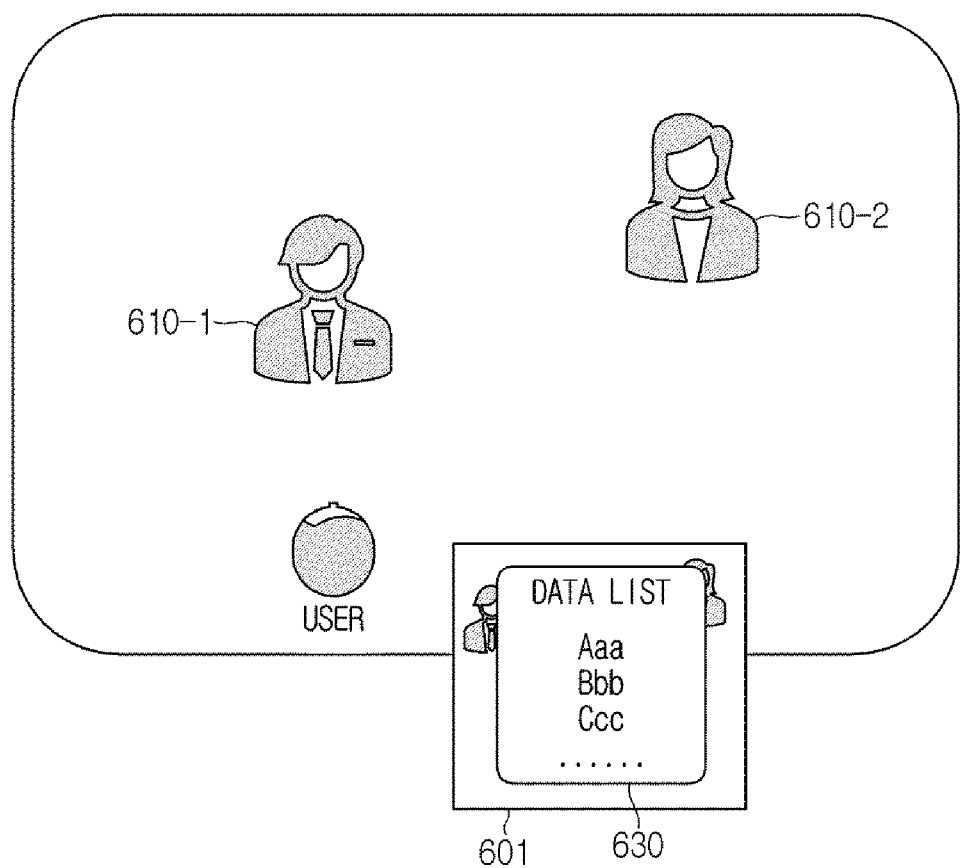
Figure 6D:
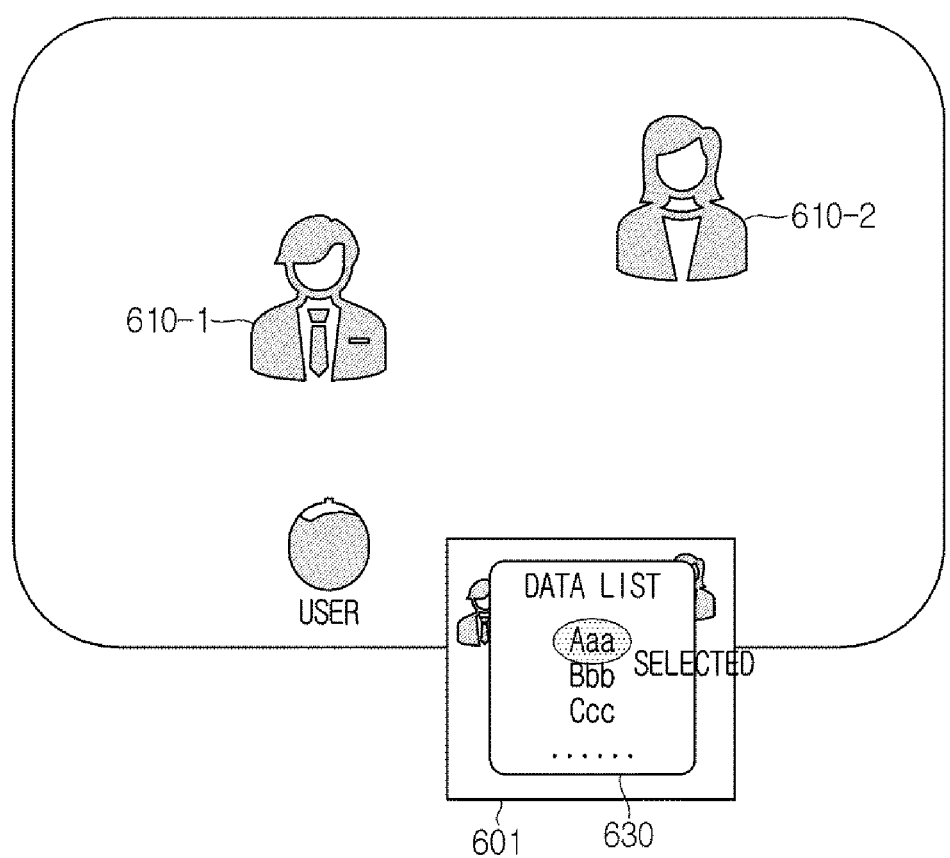
Figure 6E:
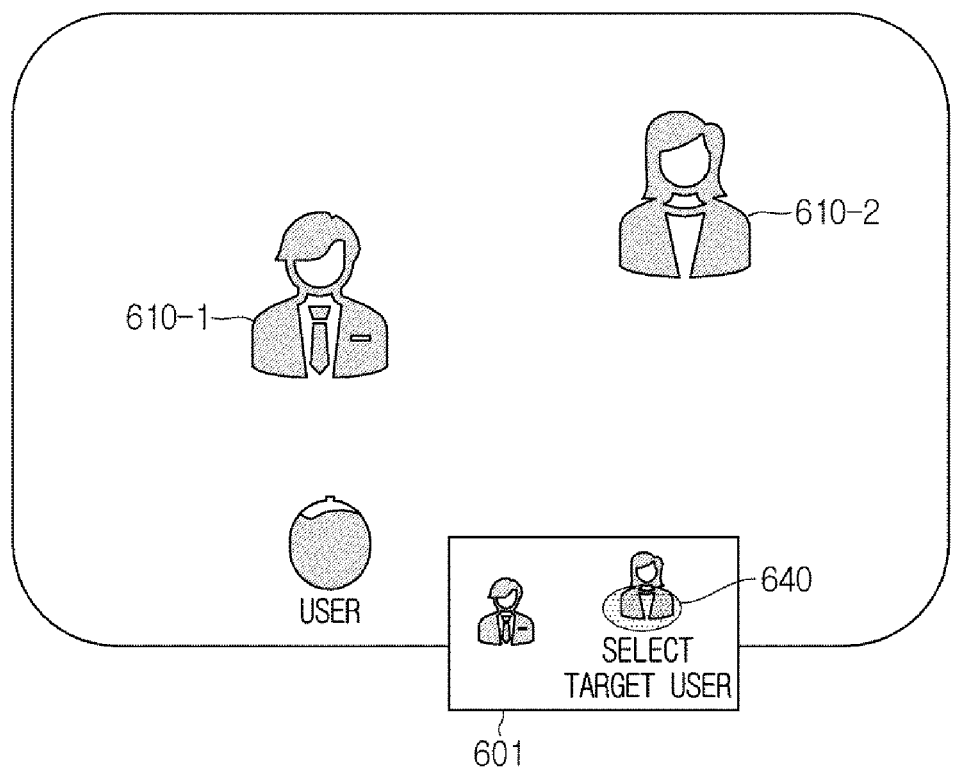

Meanwhile, the user terminal 601 may display data received from the edge node device, that is, the data list to be shared (refer to FIG. 6D). The user may select at least one in the data list to be shared, which is displayed on the user terminal 601, and as the at least one in the data list is selected, the user terminal 601 may provide a UI or menu 640 (refer to FIG. 6E) for selecting an object user to which selected data is to be forwarded. As a second user 610-2 is selected as the object user to which the selected data is to be forwarded, the user terminal 601 may request, to an edge node device, a command for forwarding the selected data to the second user 610-2, that is, the object user to which the selected data is to be forwarded, and the edge node device may request to transfer the data to the second user 610-2 that is the object user.

In response to this, the first user 610-1 may transmit, to the second user 610-2, the data selected by the second user 610-2 among data stored in a user terminal of the first user 610-1.

Figure 7:
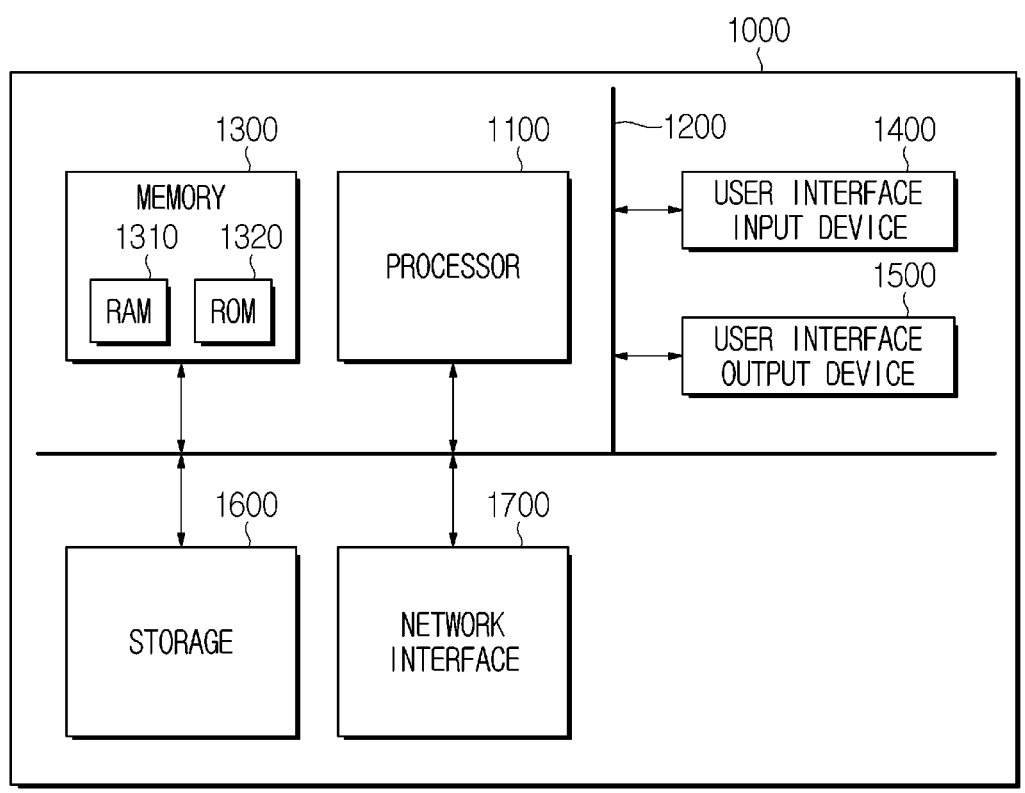
FIG. 7 is a block diagram illustrating a visual network service operating system according to an embodiment of the present disclosure.

FIG. 7 is a block diagram illustrating a visual network service operating system according to an embodiment of the present disclosure.

Referring to FIG. 7, a computing system 1000 may include at least one processor 1100, a memory 1300, a user interface input device 1400, a user interface output device 1500, a storage 1600, and a network interface 1700, which are connected through a bus 1200.

The processor 1100 may be a semi-conductor device executing the processing of commands stored in a central processing unit (CPU) or the memory 1300 and/or the storage 1600. The memory 1300 and the storage 1600 may include various types of volatile or non-volatile storage media. For example, the memory 1300 may include a read only memory (ROM) and a random access memory (RAM).

Accordingly, steps of a method or an algorithm described in relation to embodiments of the present disclosure may be directly implemented by hardware, which is executed by the processor 1100, a software module, or a combination of these two. A software module may reside in a storage medium (that is, the memory 1300 and/or the storage 1600) like RAM, flash memory, ROM, EPROM, EEPROM, register, hard disk, removable disk, and CD-ROM. An exemplary storage medium is coupled with the processor 1100, and the processor 1100 may read information from a storage medium and may write information into a storage medium. In another method, a storage medium may be integrated with the processor 1100. A processor and a storage medium may reside in an application-specific integrated circuit (ASIC). An ASIC may reside in a user terminal. In another method, a processor and a storage medium may reside in a user terminal as individual components.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for processing an application service, the method comprising:
  registering a user using a visual network service and at least one physical entity supporting the visual network service;
  mapping at least one virtual entity corresponding to the at least one physical entity;
  in response to the user's entering a visual network service space, displaying the at least one virtual entity on a terminal device of the user; and
  confirming a user input for the at least one virtual entity and controlling an operation of the at least one physical entity corresponding to the at least one virtual entity,
  wherein the controlling of the operation of the at least one physical entity comprises:
  selecting the at least one virtual entity;
  confirming a service type to be provided through the at least one virtual entity; and
  transmitting, by considering the service type, data to the physical entity corresponding to the at least one virtual entity,
  wherein the controlling of the operation of the at least one physical entity further comprises:
  confirming an object entity among the at least one virtual entity;
  confirming provided data which the object entity is to provide;
  confirming a target entity among the at least one virtual entity;
  forwarding the provided data to the target entity; and
  outputting, by a physical entity corresponding the target entity, the provided data.

2. The method of claim 1, wherein the displaying of the at least one virtual entity comprises:
  confirming state information of the at least one virtual entity; and
  displaying the state information of the at least one virtual entity.

3. The method of claim 1, wherein the service type comprises at least one of document contents sharing, media contents sharing, and message contents sharing.

4. The method of claim 1, wherein the registering of the user and the at least one physical entity comprises registering the user and the at least one physical entity to an application server that implements the visual network service.

5. The method of claim 4, wherein the mapping of the at least one virtual entity comprises:
  registering the user to a cloud control server; and
  registering, to the cloud control server, the at least one virtual entity corresponding to the at least one physical entity.

6. The method of claim 1, wherein the controlling of the operation of the at least one physical entity comprises:
  providing, by the terminal device of the user, data for identifying the object entity, the target entity and the provided data to a node device; and
  confirming, by the node device, the data for identifying the object entity, the target entity and the provided data and controlling output of the provided data to the physical entity corresponding to the target entity.

7. The method of claim 1, wherein the object entity comprises an entity configured to generate or store a media content, and
  wherein the target entity comprises an entity configured to output the media content.

8. The method of claim 1, wherein the object entity comprises an entity configured to generate or store a document content, and
  wherein the target entity comprises an entity configured to output the document content.

9. The method of claim 1, wherein the object entity comprises an entity configured to generate or store a message content, and
  wherein the target entity comprises an entity configured to output the message content.

10. An apparatus for processing an application service, the apparatus comprising:
  an application server device configured to manage a user using a visual network service and at least one physical entity supporting the visual network service;
  a cloud server device configured to manage at least one virtual entity corresponding to the at least one physical entity;

a user terminal configured to output data providing the visual network service and to provide the visual network service by confirming a user input; and a node device configured to:

map and manage at least one virtual entity corresponding to the at least one physical entity, in response to the user's entering a visual network service space, display the at least one virtual entity on a terminal device of the user, and in response to a user input, control an operation of the at least one physical entity corresponding to the at least one virtual entity, wherein the controlling of the operation of the at least one physical entity comprises:

selecting the at least one virtual entity;

confirming a service type to be provided through the at least one virtual entity; and transmitting, by considering the service type, data to the physical entity corresponding to the at least one virtual entity, wherein the controlling of the operation of the at least one physical entity further comprises:

confirming an object entity among the at least one virtual entity;

confirming provided data which the object entity is to provide;

confirming a target entity among the at least one virtual entity;

forwarding the provided data to the target entity; and outputting, by a physical entity corresponding the target entity, the provided data.

\* \* \* \* \*